(12) United States Patent
Takeuchi et al.

(10) Patent No.: US 8,019,508 B2
(45) Date of Patent: Sep. 13, 2011

(54) MOTOR-DRIVEN POWER STEERING APPARATUS

(75) Inventors: Yoshinori Takeuchi, Tochigi (JP); Yoshitaka Kubo, Tochigi (JP); Shunya Senda, Tochigi (JP)

(73) Assignee: Showa Corporation, Saitama (JP)

( * ) Notice: Subject to any disclaimer, the term of this patent is extended or adjusted under 35 U.S.C. 154(b) by 1119 days.

(21) Appl. No.: 11/716,275

(22) Filed: Mar. 9, 2007

(65) Prior Publication Data

US 2008/0217098 A1    Sep. 11, 2008

(30) Foreign Application Priority Data

Sep. 27, 2006    (JP) .................................. 2006-263495

(51) Int. Cl.
*H02P 7/00*    (2006.01)
(52) U.S. Cl. ............ 701/42; 701/41; 180/443; 180/444; 180/446; 318/432; 318/433; 318/434
(58) Field of Classification Search .................... 701/41, 701/42; 180/422, 441, 442, 443, 444, 446; 318/432, 433, 434
See application file for complete search history.

(56) References Cited

U.S. PATENT DOCUMENTS

| | | | | |
|---|---|---|---|---|
| 4,771,843 A | * | 9/1988 | Shimizu | 180/446 |
| 6,326,753 B1 | * | 12/2001 | Someya et al. | 318/471 |
| 6,880,669 B2 | * | 4/2005 | Matsuoka et al. | 180/446 |
| 7,031,813 B2 | * | 4/2006 | Sugiyama et al. | 701/41 |

FOREIGN PATENT DOCUMENTS

| | | |
|---|---|---|
| EP | 1323620 A | 7/2003 |
| EP | 1419952 A2 | 5/2004 |
| JP | 06 008839 A | 1/1994 |
| JP | HEI 6-8839 | 1/1994 |

* cited by examiner

*Primary Examiner* — Thomas G Black
*Assistant Examiner* — Peter D Nolan
(74) *Attorney, Agent, or Firm* — Orum & Roth LLC

(57) ABSTRACT

In a motor-driven power steering apparatus, there is provided a correction coefficient memory previously storing an output correction coefficient to be multiplied by a current control signal applied to an electric motor at certain points in a range of temperatures in such a manner as to correct a temperature dependent output torque changing in dependence upon an environmental temperature of the electric motor to a demand output torque required in the electric motor. A temperature sensor for detecting the environmental temperature of the electric motor is provided, a correction coefficient computing circuit for reading the output correction coefficient corresponding to the temperature detected by the temperature sensor from the correction coefficient memory is provided, and a current control computing means for calculating a corrected current control signal by multiplying the current control signal of the electric motor computed on the basis of a steered condition of a vehicle by the output correction coefficient read from the correction coefficient computing circuit is provided. The drive control signal is output based on the corrected current control signal to the motor driving means.

4 Claims, 6 Drawing Sheets

MOTOR-DRIVEN POWER STEERING APPARATUS

BACKGROUND OF THE INVENTION

1. Field of the Invention

The present invention relates to a motor-driven power steering apparatus.

2. Description of the Related Art

In a motor-driven power steering apparatus, as described in Japanese Patent Application Laid-open No. 6-8839 (patent document 1), an electric motor is driven by a motor driving means, a rotation of the electric motor is converted into a linear stroke of a rack shaft by a power transmission mechanism, and a wheel coupled to the rack shaft is steered and assisted.

It may happen that the electric motor employed in the motor-driven power steering apparatus is used in a wide working temperature range, from a low temperature of, for example, −40° C. or less, to a high temperature of, for example, 100° C. or more, due to an installation position under a hood or the like. An output torque characteristic thereof is changed while exposed to such environmental temperature conditions, so that a magnet is demagnetized toward a higher temperature, and the output torque characteristic is lowered.

On the other hand, in the motor-driven power steering apparatus, a minimum output torque $T_0$ (called as a demand output torque) to be provided in the electric motor is necessary with respect to every traveling condition of a vehicle.

Accordingly, in the prior art, it is necessary to arrange that the output torque characteristic with respect to the temperature dependency of the electric motor becomes equal to or more than the demand output torque $T_0$ in a whole working temperature range to be estimated. In other words, it is necessary to employ an electric motor in which an output torque of a motor taking temperature dependency into consideration is as shown by a line B in FIG. 8.

However, since the output torque characteristic of the temperature dependency of the electric motor shown by line B in FIG. 8 is set such as to secure the demand output torque $T_0$ in the high temperature range, the output torque characteristic is set to an excess specification which exceeds the demand output torque $T_0$ in the low temperature range by itself. Accordingly, it has been conventionally desired that the electric motor satisfies the demand output torque in the whole working temperature range and its capacity is reduced to a minimum limit.

SUMMARY OF THE INVENTION

An object of the present invention is to provide an electric motor which reduces (downsizes) capacity while satisfying a minimum demand output torque in an entire working temperature environment range, in a motor-driven power steering apparatus.

The present invention relates to a motor-driven power steering apparatus driving an electric motor by a motor driving means, converting rotation of the electric motor into a linear stroke of a rack shaft by a power transmission mechanism, and steering and assisting a wheel coupled to the rack shaft. The invention includes a correction coefficient memory previously storing an output correction coefficient to be multiplied by a current control signal applied to the electric motor at certain points in a range of temperatures in such a manner as to correct a temperature dependent output torque which changes in dependence upon an environmental temperature of the electric motor to a predetermined demand output torque required in the electric motor. A temperature sensor is present for detecting the environmental temperature of the electric motor. A correction coefficient computing circuit is employed for reading the output correction coefficient corresponding to the temperature detected by the temperature sensor from the correction coefficient memory. A current control computing means calculates a corrected current control signal by multiplying the current control signal of the electric motor computed on the basis of a steered condition of a vehicle by the output correction coefficient read from the correction coefficient computing circuit, and outputting the drive control signal based on the corrected current control signal to the motor driving means.

BRIEF DESCRIPTION OF THE DRAWINGS

The present invention will be more fully understood from the detailed description given below and from the accompanying drawings which should not be taken to be a limitation on the invention, but are for explanation and understanding only. The drawings.

DESCRIPTION OF THE PREFERRED EMBODIMENTS

Embodiment 1 (FIGS. 1 to 5)

Figure 1:
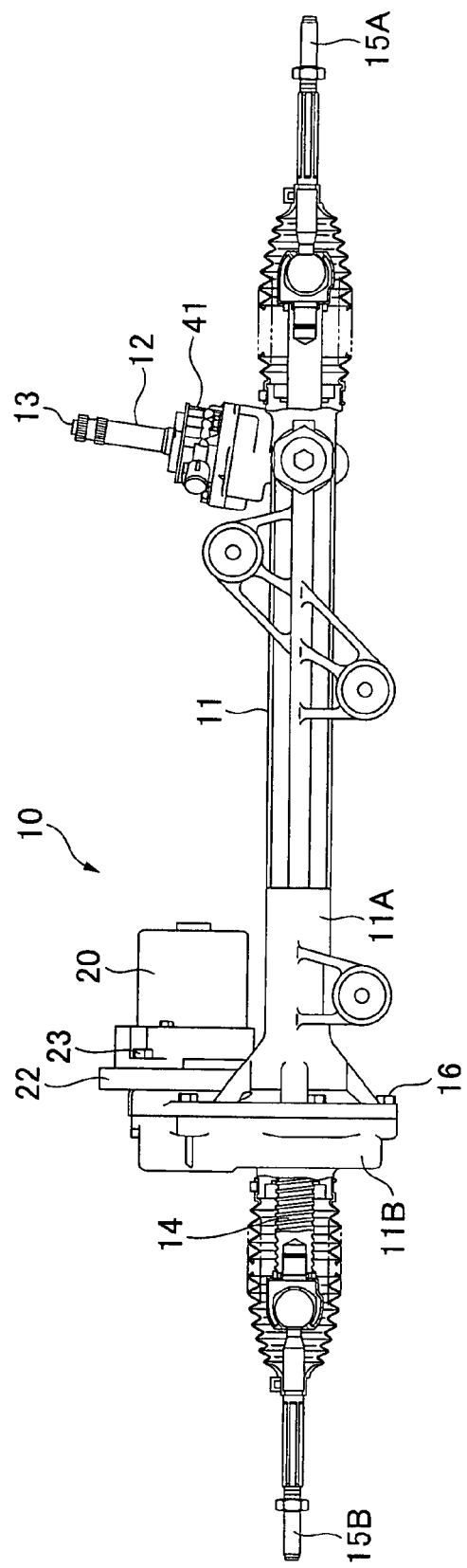
FIG. 1 is a front elevational view showing a motor-driven power steering apparatus; F

A motor-driven power steering apparatus 10 structure is shown in FIG. 1. A first gear housing 11A and a second gear housing 11B are provided by dividing a gear housing 11. An input shaft 12 (steering shaft) to which a steering wheel is coupled is supported to the gear housing 11 (the first gear housing 11A). An output shaft (not shown) is coupled to the input shaft 12 via a torsion bar 13 (not shown). A pinion (not shown) is provided in the output shaft. A rack shaft 14 engaging with the pinion is supported to the gear housing 11 so as to be movable linearly in a lateral direction. A steering torque sensor 41 is provided between the input shaft 12 and the output shaft. The steering torque sensor 41 detects steering torque on the basis of a relative rotational displacement amount generated between the input shaft 12 and the output shaft due to an elastic torsional deformation of a torsion bar caused by steering torque of a manual steering input applied to a steering wheel, and outputs a steering torque signal Ts.

The motor-driven power steering apparatus 10 is structured such that both end portions of the rack shaft 14 are protruded to both sides of the gear housing 11 (the first gear housing 11A and the second gear housing 11B), and tie rods 15A and 15B are coupled to end portions thereof. Left and right wheels can be steered via the tie rods 15A and 15B working with a linear movement of the rack shaft 14.

Figure 2:
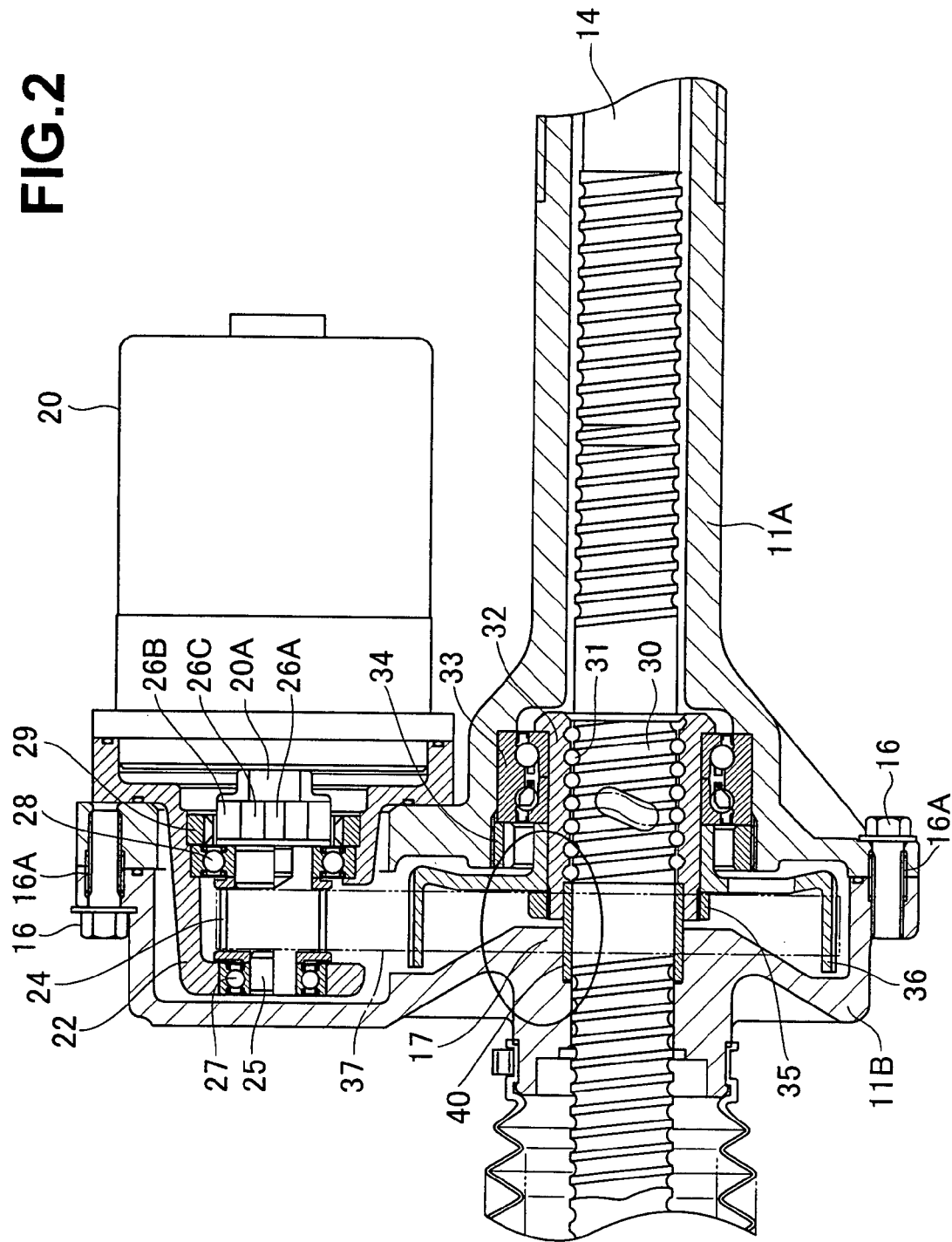
FIG. 2 is a cross sectional view showing a main portion of the motor-driven power steering apparatus.

The motor-driven power steering apparatus 10 is structured, as shown in FIG. 2, such that an electric motor 20 is fixed to a holder 22 by a mounting bolt 21 (not shown). The holder 22 can be attached to and detached from the first gear housing 11A by a mounting bolt 23. The holder 22 attached to the first gear housing 11A and inserted to an inner portion of the first gear housing 11A has a fixed gap with respect to inner peripheries of the gear housings 11A and 11B. Oscillation of the holder 22 is allowed with respect to the first gear housing 11A. It is possible to adjust tension of a belt 37 wound around a drive pulley 24 and a driven pulley 36 which are supported to the holder 22 in a manner mentioned below.

The holder 22 supports a center axis 25 of the drive pulley 24, and engages and attaches a joint 26A in an axial end of a rotating shaft 20A of the electric motor 20 and a joint 26B in an axial end of the center axis 25 with each other from an axial direction. An intermediate joint 26C such as a rubber buffer or the like is pinched between teeth provided at a plurality of positions in a peripheral direction. The drive pulley 24 is supported at both end portions of the center axis 25 to the holder 22 by bearings 27 and 28. Reference numeral 29 denotes a stop ring for fixing an outer ring of the bearing 28.

The motor-driven power steering apparatus 10 is structured such that a ball screw 30 is provided in the rack-shaft 14. A ball nut 32 engaging with the ball screw 30 via a ball 31 is provided. The ball nut 32 is rotatably supported by a bearing 33 supported to the gear housing 11(the first gear housing 11A). Reference numeral 34 denotes a nut for fixing an outer ring of the bearing 33. The driven pulley 36 is fixed to an outer periphery of the ball nut 32 by a lock nut 35.

The motor-driven power steering apparatus 10 is structured such that the belt 37 is wound around the drive pulley 24 in a side of the electric motor 20, and the driven pulley 36 in a side of the ball nut 32. The rotation of the electric motor 20 is transmitted to the ball nut 32 via the drive pulley 24, and the belt 37 and the driven pulley 36, and is converted into a linear stroke of the rack shaft 14 by extension, thereby linearly moving the rack shaft 14. Accordingly, the electric motor 20 applies a steering assist force to a steering system.

The motor-driven power steering apparatus 10 is structured such that the rack shaft 14 supported to the first gear housing 11A is passed through the second gear housing 11B. The holder 22 attached to the first gear housing 11A is covered by the second gear housing 11B. The first gear housing 11A and the second gear housing 11B are fastened by a plurality of fastening bolts 16. The first gear housing 11A and the second gear housing 11B are positioned by striking both end portions of a plurality of tubular knock pins 16A and are thereafter engaged and fastened by the fastening bolts 16 inserted to the respective knock pins 16A, as shown in FIG. 2. A part of the fastening bolts 16 is engaged with the first gear housing 11A through the knock pin 16A, and the other fastening bolts 16 are fastened to the second gear housing 11B through the knock pin 16A.

The motor-driven power steering apparatus 10 is provided with the following structure for making an oscillation of the rack shaft 14 supported to the gear housings 11A and 11B small.

In the second gear housing 11B, a portion facing to the ball nut 32 supported to the first gear housing 11A is set to a bush support portion 17, and a bush 40 is bridged between the ball nut 32 and the bush support portion 17. The bush 40 is pressed into a leading end side inner peripheral portion of the ball nut 32 so as to be fixedly provided. The rack shaft 14 is supported in a linearly sidable manner to an inner peripheral portion of the bush support portion 17 so as to be rotationally slidable.

The bush 40 allows a part in an axial direction of an outer periphery of a tube body made of a metal or the like to be a slidable portion with the bush support portion 17, and allows an entire portion of an inner periphery to be a slidable portion with the rack shaft 14. The sidable portion is obtained by forming a lubricating coating layer made of an oil-contained polyacetal, a tetrafluoroethylene or the like on a surface of the tube body in accordance with a coating or the like.

Figure 3:
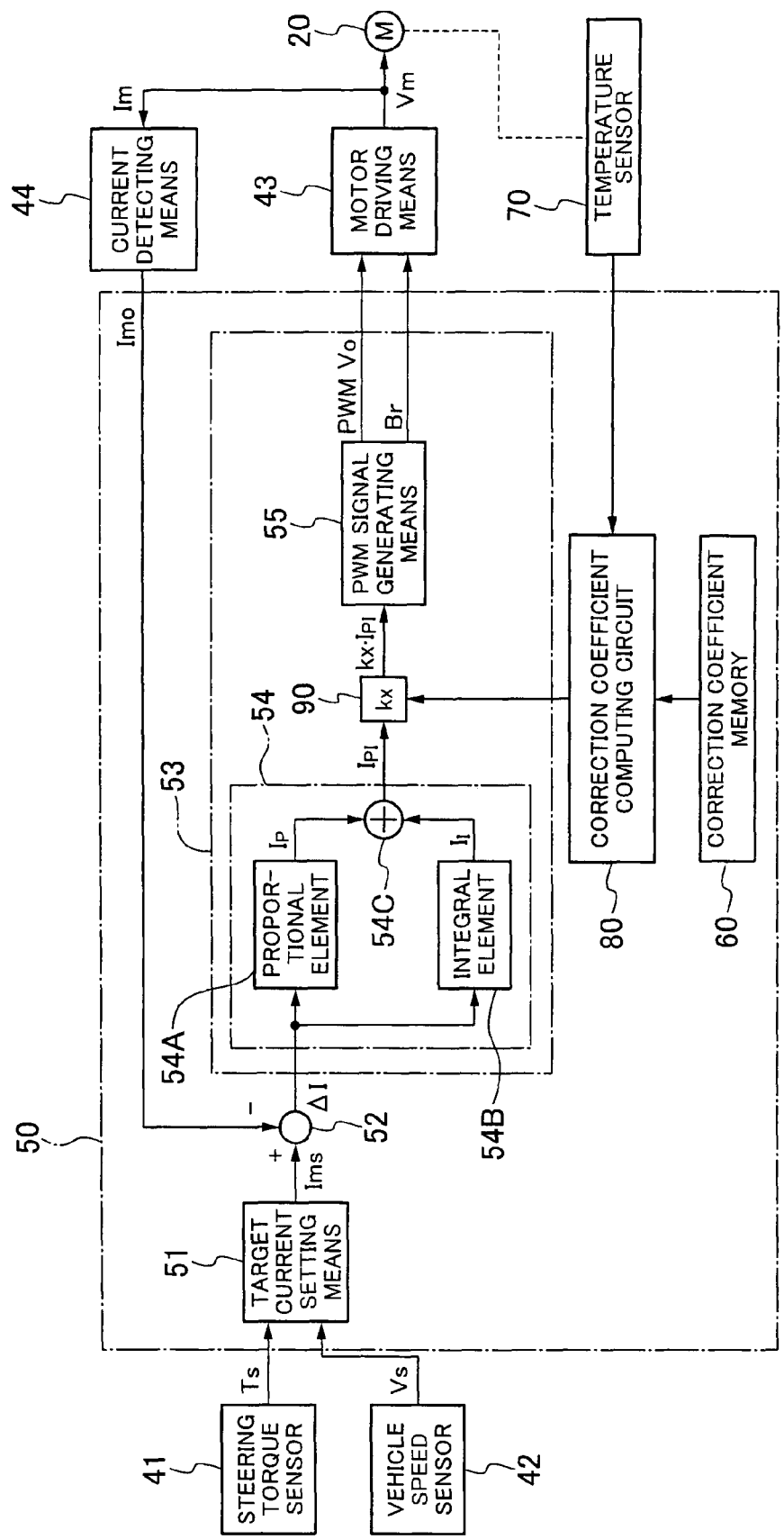
FIG. 3 is a block diagram showing a control system of an embodiment 1 of the motor-driven power steering apparatus.

The motor-driven power steering apparatus 10 has the following controller 50 for the electric motor 20 (FIG. 3).

A controller 50 is accessorily provided with a steering torque sensor 41 and a vehicle speed sensor 42. The steering torque sensor 41 detects the steering torque of the steering system and outputs the steering torque signal Ts to the controller 50 as mentioned above. The vehicle speed sensor 42 detects a vehicle speed and outputs a vehicle speed signal Vs to the controller 50.

The controller 50 has various arithmetic processing means, signal generating means, memories or the like available through the use of a microprocessor. The controller 50 generates a drive control signal $V_0$ (PWM signal) to which a proportional control (P) and an integral control (I) are applied, thereby driving and controlling the motor driving means 43.

The motor driving means 43 is structured by a bridge circuit constituted by four switching elements, for example, four power field effect transistors (FET), insulated gate bipolar transistors (IGBT) or the like, outputs a motor voltage Vm on the basis of the drive control signal $V_0$, and drives the electric motor 20. When the steering wheel is steered in a clockwise direction, the steering assist force is applied to the steering system in such a manner that the front wheels are turned in a clockwise direction, for example, by positively rotating the electric motor 20.

The controller 50 is accessorily provided with a current detecting means 44. The current detecting means 44 detects a motor current Im actually flowing through the electric motor 20, and feeds back a detected current signal Imo converted into a digital signal corresponding to the motor current Im to the controller 50 (negative feedback).

The controller 50 has a target current setting means 51, a deviation computing means 52 and a current control computing means 53.

The target current setting means 51 is provided with a memory such as a read only memory (ROM) or the like. The target current setting means 51 reads an assist current signal Ima with respect to a steering torque signal Ts having the vehicle speed signal Vs as a parameter from the steering torque signal Ts output by the steering torque sensor 41, and a target current signal Ims map previously stored in the memory on the basis of the steering torque signal Ts and the vehicle speed signal Vs output by the vehicle speed sensor 42. The target current setting means 51 outputs the assist current signal Ima as the target current signal Ims to the deviation computing means 52.

The deviation computing means 52 computes a deviation (Ims−Imo) between the target current signal Ims and the detected current signal Imo, and outputs a deviation signal ΔI to the current control computing means 53.

The current control computing means 53 gives a direction (a rotational direction of the electric motor 20) polarity signal Br and a PWM signal $V_0$ corresponding to a duty ratio to the motor driving means 43 of the electric motor 20 in correspondence to the deviation signal ΔI between the target current signal Ims and the detected current signal Imo.

The current control computing means 53 is constituted by a proportional integral (PI) control means 54, and a PWM signal generating means 55.

The PI control means 54 is provided with a proportional element 54A generating a proportional sensitivity KP so as to execute a proportional control, an integral element 54B generating an integral gain KI so as to execute an integral control, and an adder adding output signals of the proportional element 54A and the integral element 54B. The proportional element 54A and the integral element 54B are connected in parallel. The proportional element 54A and the integral element 54B respectively output a proportional signal IP obtained by multiplying the deviation signal ΔI by the proportional sensitivity KP and an integral signal II obtained by applying an integral process having an integral gain KI to the deviation signal Al to the adder 54C. The adder 54C adds the proportional signal IP and the integral signal II, and outputs the proportional integral signal IPI (IP+II) toward the PWM signal generating means 55.

The PWM signal generating means 55 outputs a direction polarity signal Br corresponding to a direction and a magnitude of the proportional integral signal IPI and a PWM signal corresponding to the duty ratio as a drive control signal $V_O$ toward the motor driving means 43. The motor driving means 43 drives the electric motor 20 on the basis of a motor drive voltage Vm.

Accordingly, the controller 50 executes the following assist control with respect to the electric motor 20 of the motor-driven power steering apparatus 10.

(1) When the steering torque detected by the steering torque sensor 41 is lower than a predetermined value, the steering assist force is not necessary, and the electric motor 20 is not driven.

(2) When the steering torque detected by the steering torque sensor 41 is more than the predetermined value, a steering assist force is necessary. Accordingly, the electric motor 20 is driven so as to be normally rotated, and assist control is executed. The rotating force of the electric motor 20 is transmitted to the ball nut 32 via the drive pulley 24, the belt 37 and the driven pulley 36, and is formed as a steering assist force linearly stroking the rack shaft 14 via the ball screw 30.

Accordingly, the motor-driven power steering apparatus 10 in accordance with the embodiment 1 is provided with the following structure so that the electric motor 20 can reduce its capacity while satisfying a predetermined demand output torque T0 in an entire working temperature range.

Figure 4:
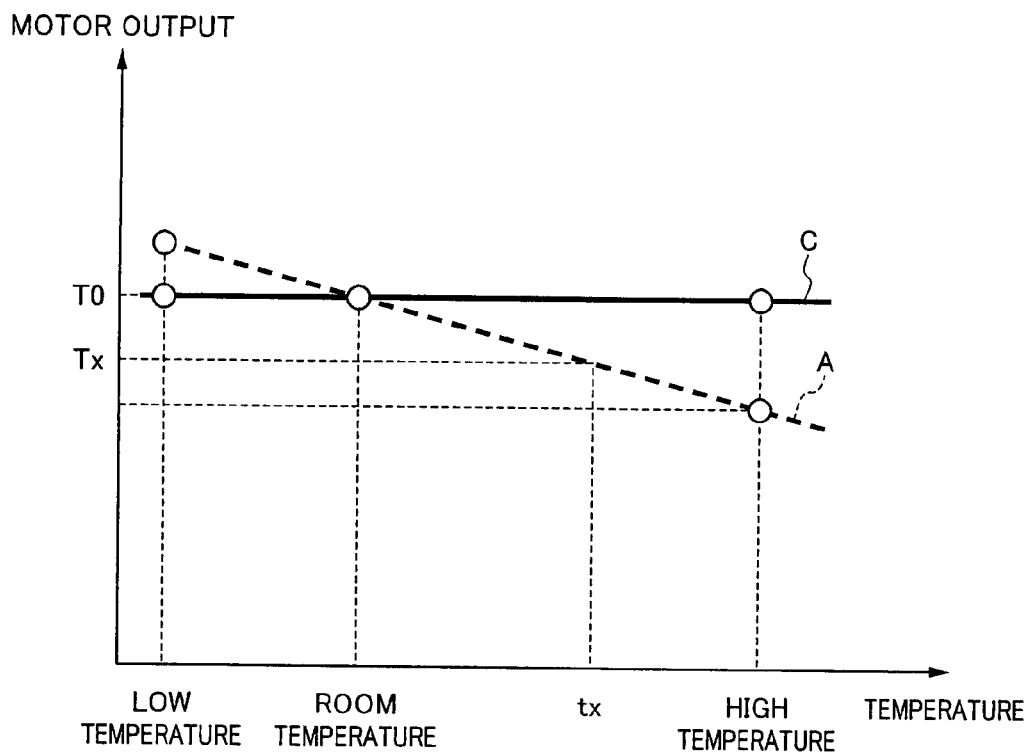
FIG. 4 is a graph showing an output torque characteristic of an embodiment 1 which is corrected in each of working temperatures of an electric motor.
Figure 5:
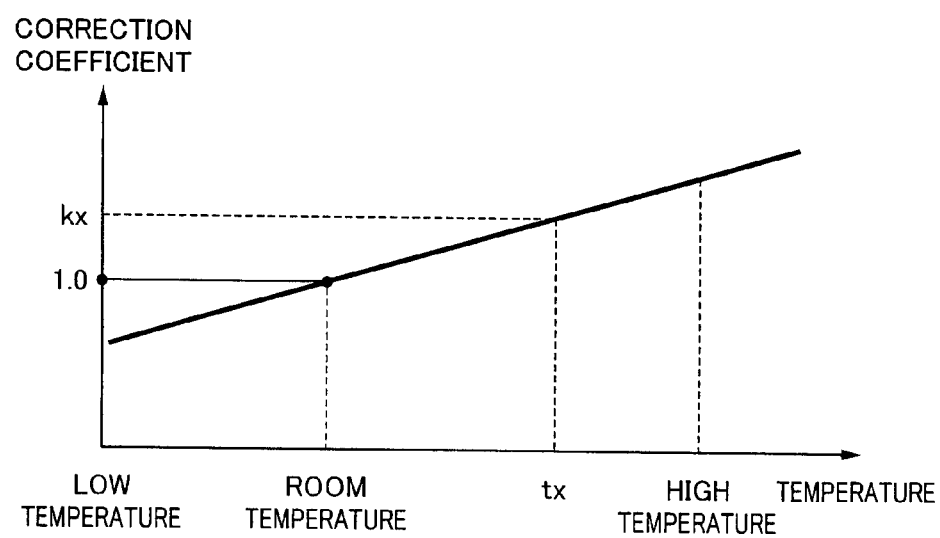
FIG. 5 is a graph showing an output correction coefficient in which a room temperature is set to a reference temperature.

The controller 50 corrects a temperature dependent output torque (for example, an output torque characteristic A in FIG. 4) which is changing depending upon on an environmental temperature of the electric motor 20 so as to conform to a predetermined demand output torque $T_0$ required for the electric motor 20, as shown in FIG. 4. A correction coefficient memory 60 is provided for previously determining and storing an output correction coefficient kx to be multiplied by a current control signal applied to the electric motor 20 with respect to each of the temperatures tx.

The temperature dependent output torque characteristic A shown in FIG. 4 is obtained by feeding a constant current, for example, to a plurality of electric motors 20 having the same standard product, changing the environmental temperature between the low temperature range and the high temperature range, measuring its motor output torque in each of the temperatures (or calculating the output torque on the basis of the detected current and the detected voltage of the electric motor 20), and averaging a plurality of output torques obtained in the respective temperatures per the temperatures. The temperature dependent output torque characteristic A in FIG. 4 forms an approximate downward sloping straight line from the low temperature region toward the high temperature region, and brings an output torque in a room temperature into line with the demand output torque To. Where the temperature at which the temperature dependent output torque coincides with the demand output torque $T_0$ is called as a reference temperature, the reference temperature is the room temperature in the electric motor 20 in accordance with the present embodiment.

An output correction coefficient kx at each of the temperatures tx which is previously determined in the electric motor 20 having the temperature dependent output torque characteristic A in FIG. 4 is calculated as a ratio T0/Th=kx between the predetermined demand output torque To and the temperature dependent output torque Th, where the temperature dependent output torque at the temperature tx is set to Tx in FIG. 4. The output correction coefficient kx forms an approximate straight line with respect to the temperature, has a value of 1.0 or more at a temperature equal to or more than the room temperature corresponding to the reference temperature, and has a value of 1.0 or less at a temperature equal to or less than the room temperature.

The controller 50 is additionally provided with a temperature sensor 70 detecting an environmental temperature of the electric motor 20. The temperature sensor 70 can be constituted by a thermistor or the like provided in a substrate of the controller 50, may be arranged beside the electric motor 20, or may be directly arranged in the motor.

The controller 50 is provided with a correction coefficient computing circuit 80 reading the output correction coefficient kx corresponding to the temperature tx detected by the temperature sensor 70 from the correction coefficient memory 60. Further, the controller 50 has a multiplication means 90 for calculating a corrected current control signal kx·IPI. This is achieved by multiplying the current control signal of the electric motor 20 computed on the basis of a steered condition (a steering torque signal Ts and a vehicle speed signal Vs) of the vehicle, that is, a proportional integral signal IPI computed by a target current setting means 51, a deviation computing means 52 and a PI control means 54 of a current control computing means 53 in the present embodiment by the output correction coefficient kx read from the correction coefficient computing circuit 80. The PWM signal generating means 55 of the current control computing means 53 outputs a direction polarity signal Br corresponding to a direction and a magnitude of the correction current control signal kx·IPI and a PWM signal corresponding to a duty ratio as a driving control signal $V_O$ based on the correction current control signal kx·IPI toward the motor driving means 43. The motor driving means 43 drives the electric motor 20 by a motor drive voltage Vm.

In accordance with the present embodiment, the following operation and effect can be obtained.

Figure 8:
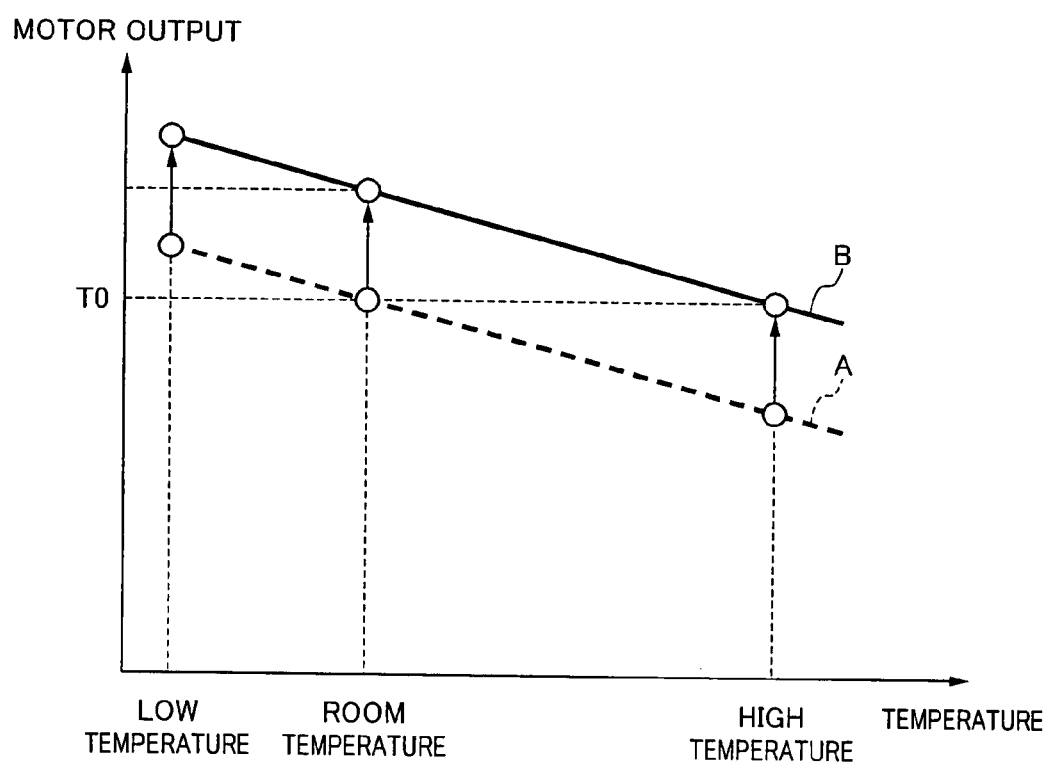
FIG. 8 is a graph showing an output torque characteristic depending on a temperature of a conventional electric motor.

The output correction coefficient kx corresponding to the current temperature of the electric motor 20 detected by the temperature sensor 70 is read from the correction coefficient memory 60, the corrected current control signal is calculated by multiplying the current control signal of the electric motor 20 computed on the basis of the steered condition of the vehicle by the read output correction coefficient kx, and the electric motor 20 is driven by using the corrected current control signal. At this time, the output correction coefficient kx is structured such as to correct the temperature dependent output torque changing in dependence upon the environmental temperature of the electric motor 20 so that the electric motor 20 arrives at and produces the predetermined demand output torque $T_0$. Accordingly, it is not necessary to set (the characteristic B) such that the temperature dependent output torque (the characteristic A) of the electric motor 20 satisfies the demand output torque $T_0$ in the entire working temperature range to be estimated such as the conventional output torque characteristic (FIG. 8), and the corrected output torque (FIG. 4) characteristic C of the electric motor 20 can secure the demand output torque $T_0$ in the whole working temperature range, and can reduce an excess capacity increase of the electric motor 20. In other words, in the present embodiment, it is possible to employ the temperature dependent output torque characteristic A (FIG. 4) of the electric motor 20 such that the low torque characteristic A (FIG. 4) comes from the conventional output torque characteristic B (FIG. 8), and the electric motor 20 is sufficient in a reduced and relatively small capacity.

Figure 6:
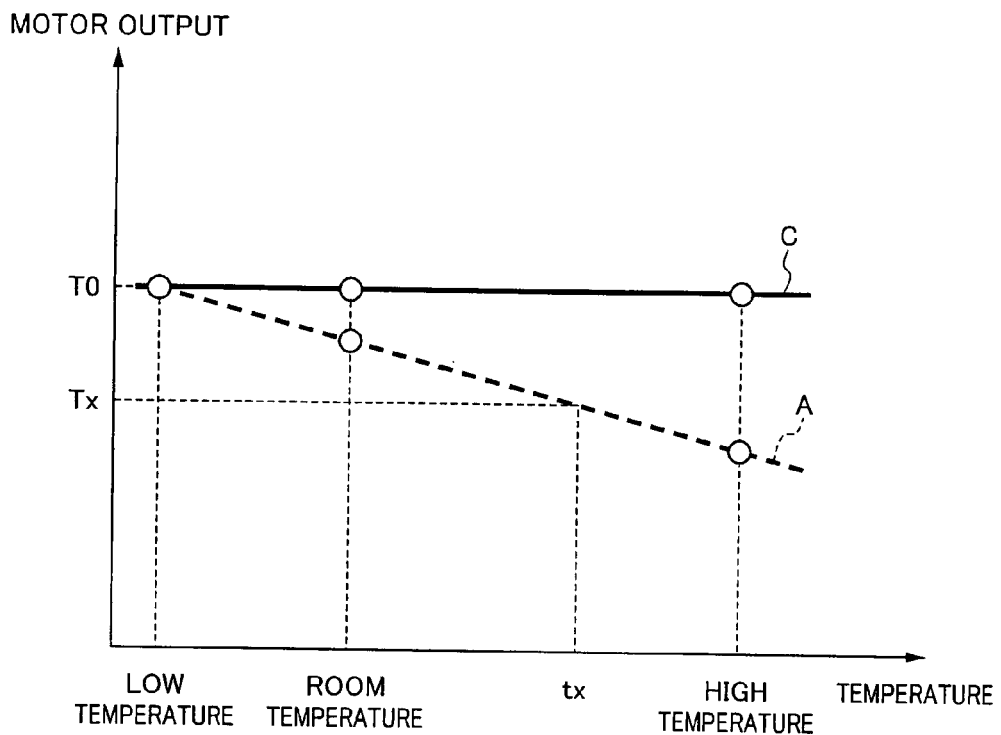
FIG. 6 is a graph showing an output torque characteristic of an embodiment 2 which is corrected in each of working temperatures of the electric motor.
Figure 7:
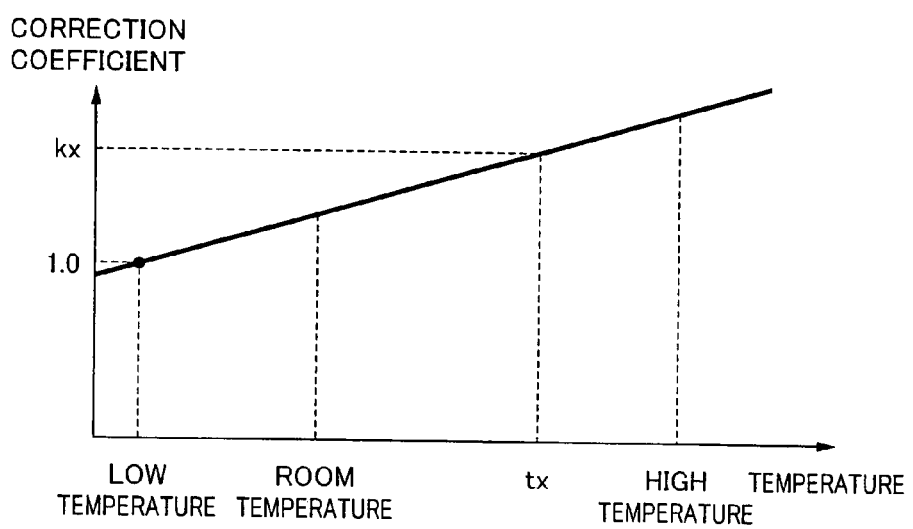
FIG. 7 is a graph showing an output correction coefficient in which a room temperature is set to a reference temperature.

Embodiment 2 (FIGS. 6 and 7)

An embodiment 2 is structured such that the output correction coefficient kx is set to be equal to or more than 1 in the entire working temperature range between the low temperature and the high temperature which is estimated in the electric motor 20, in the motor-driven power steering apparatus 10 in accordance with the embodiment 1.

In other words, as shown by a temperature dependent output torque characteristic A in MG. 6, in order to achieve the demand output torque $T_0$ in the entire working temperature range of the electric motor 20 while employing the small-capacity electric motor 20 having the output torque characteristic A in which the output torque of the low temperature coming to the reference temperature coincides with the demand output torque $T_0$, the output correction coefficient kx to be stored in the correction coefficient memory 60 of the controller 50 for the electric motor 20 is set as shown in FIG. 7. In other words, the output correction coefficient kx of the low temperature corresponding to the reference temperature is set to 1.0, and the output correction coefficient kx is set to be equal to or greater than 1.0 at the temperature tx in the entire working temperature range equal to or greater than the low temperature.

In accordance with the present embodiment, the output correction coefficient kx in the item (a) mentioned above is set to be equal to or more than 1 in the entire working temperature range estimated in the electric motor 20. Accordingly, the corrected output torque characteristic C of the electric motor 20 can secure the demand output torque $T_0$ in the entire working temperature range while setting the temperature dependent output torque characteristic A of the electric motor 20 to the demand output torque $T_0$ or less in the whole working temperature range. Since it is possible to set the temperature dependent output torque characteristic A of the electric motor 20 to the demand output torque $T_0$ or less in the entire working temperature range, it is possible to minimize the capacity of the electric motor 20.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus driving an electric motor by a motor driving structure, converting rotation of the electric motor into a linear stroke of a rack shaft by a power transmission mechanism, and steering and assisting a wheel coupled to the rack shaft, comprising; a correction coefficient memory previously storing an output correction coefficient to be multiplied by a current control signal applied to the electric motor for at least one point in a range of temperatures in a such a manner as to correct a temperature dependent output torque which changes in dependence upon an environmental temperature of the electric motor to a predetermined demand output torque required in the electric motor; wherein values for the temperature dependent output torque are calculated and established as a function of temperature;

a temperature sensor detecting the environmental temperature of the electric motor; a correction coefficient computing circuit reading the output correction coefficient corresponding to the temperature detected by the temperature sensor from the correction coefficient memory; and a current control computing element calculating a corrected current control signal by multiplying the current control signal of the electric motor computed on the basis of a steered condition of a vehicle by the output correction coefficient read from the correction coefficient computing circuit, and outputting a drive control signal based on the corrected current control signal to the motor driving structure, wherein the temperature dependent output torque is obtained by feeding a constant current to each of the electric motors of the same standard product, changing the environmental temperature between a low temperature range and a high temperature range, measuring the motor output torque at each of the temperatures, and averaging a plurality of output torques obtained at the respective temperatures per the temperatures.

2. A motor-driven power steering apparatus as claimed in claim 1, wherein the output correction coefficient at each of the temperatures is calculated as a ratio $T_0/Tx$ between a predetermined demand output torque $T_0$ and a temperature dependent output torque Th at the temperature.

3. A motor-driven power steering apparatus as claimed in claim 1, wherein the output correction coefficient is set to be equal to or greater than 1 in an entire working temperature range estimated in the electric motor.

4. A motor-driven power steering apparatus as claimed in claim 2, wherein the output correction coefficient is set to be equal to or greater than 1 in an entire working temperature range estimated in the electric motor.

* * * * *